Mar. 20, 1923.
M. ERSHKOWITZ
AUXILIARY STEERING ELEMENT FOR THE HANDLEBARS OF VEHICLES
Filed Aug. 10, 1920
1,448,921
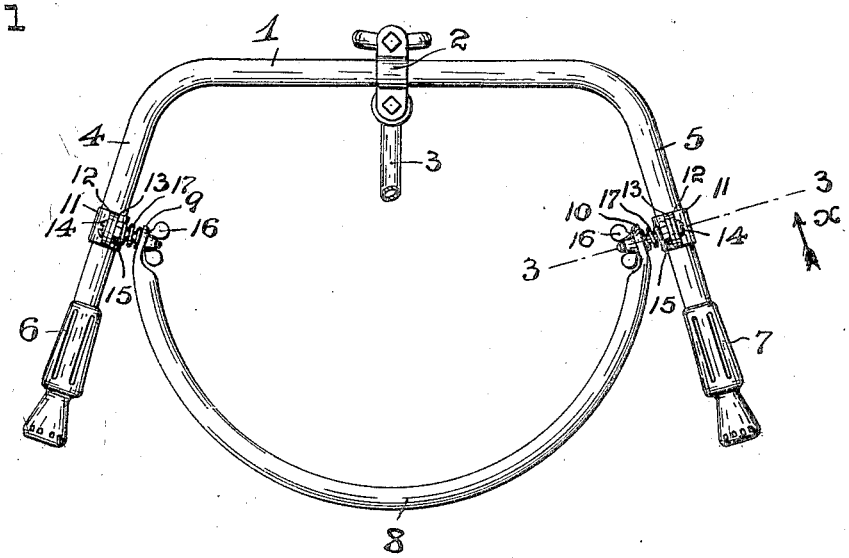
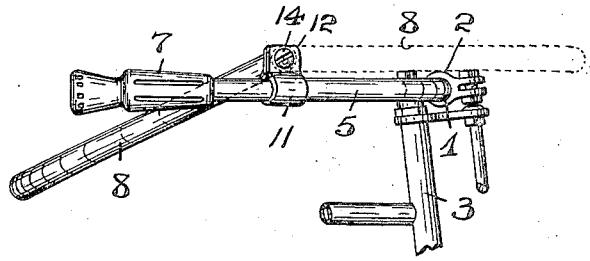
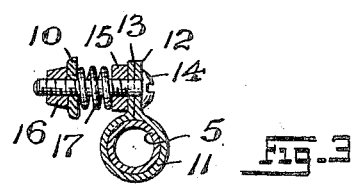
INVENTOR:
Michael Ershkowitz,
BY
Frantz and Richards
ATTORNEYS Patented Mar. 20, 1923.

1,448,921

UNITED STATES PATENT OFFICE.

MICHAEL ERSHKOWITZ, OF IRVINGTON, NEW JERSEY, ASSIGNOR TO SAMUEL ERSHKOWITZ, OF JERSEY CITY, NEW JERSEY.

AUXILIARY STEERING ELEMENT FOR THE HANDLE BARS OF VEHICLES.

Application filed August 10, 1920. Serial No. 402,662.

*To all whom it may concern:*

Be it known that I, MICHAEL ERSHKOWITZ, a citizen of the United States, residing at Irvington, in the county of Essex and State of New Jersey, have invented certain new and useful Improvements in Auxiliary Steering Elements for the Handle Bars of Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in handle-bars for vehicles; and, the present invention has reference, more particularly, to the application of an auxiliary handle-bar, for use in connection with the usual handle-bars of motor-cycles, bicycles, and similar vehicles.

The principal object of the present invention is to provide in connection with the usual handle-bars of vehicles of the character above specified, and especially with the handle-bars of a motor-cycle, an auxiliary handle-bar which is pivotally connected with the said main handle-bars, and which is arranged in such a manner, that the rider can remove his hands from the widely separated handles of the usual bars, when tired, and placed upon the pivotally connected auxiliary bar, which may be angularly disposed upon the lap of the rider, for not only removing the strain from the arms of the rider, but also serving as a comfort to the rider in enabling him to obtain a better seating posture upon the seat of the vehicle.

The invention has for its further object to provide in addition to the usual fixed handle bars of a motor-cycle, an auxiliary and spring-controlled handle-bar which can be easily and readily thrown out of the way, by means of a knee-thrust of the rider against the same, when quick action in dismounting becomes necessary.

Other objects of the present invention not at this time more particularly enumerated, will be clearly understood from the following detailed description of the present invention.

With the various objects of the present invention in view, the said invention consists, primarily, in the novel auxiliary handle-bar for motor-cycles, bicycles, and similar vehicles, hereinafter more fully set forth; and, the present invention consists, furthermore in the novel arrangements and combinations of the various devices and parts, as well as in the details of the construction of the said parts, all of which will be more fully described in the following specification, and then finally embodied in the clauses of the claims, which are appended to and which form an essential part of the said specification.

The invention is clearly illustrated in the accompanying drawings, in which:—

Figure 1 is a top or plan view of the usual handle-bars of a motor-cycle, attached in the usual manner to the steering post of the vehicle, a portion of which is shown in said figure, said view illustrating in connection with said handle-bars, an auxiliary handle-bar made according to and embodying the principles of the present invention.

Figure 2 is a side elevation of the various devices and parts represented in said Figure 1; and Figure 3 is a detail vertical cross-sectional representation, said section being taken on line 3—3 in said Figure 1, looking in the direction of the arrow X, and said view being made on an enlarged scale.

Similar characters of reference are employed in all of the said above described views, to indicate corresponding parts.

Referring now to the said figures of the drawings, the reference-character 1 indicates the usual steering yoke or bar of a motor-cycle which is secured in any suitable and usual manner, by means of a clamp 2, or otherwise, to the usual steering rod or post 3 of the vehicle. As shown in the drawings, the said yoke or bar 1 is made with the usual rearwardly projecting members or arms 4 and 5, said members or arms being angularly connected with the main portion of the yoke or bar 1 and extending in outward directions, with relation to each other, as represented in Figure 1 of the drawings, and at their free ends being provided with the usual handles 6 and 7.

Now it is well known to riders of motorcycles, that the positions of the said members or arms 4 and 5, and of their handles 6 and 7, are spread so far apart, that with fast and long riding, the arms of the rider become very tired.

To overcome this unsatisfactory condition, the application of the above-mentioned auxiliary steering element in the form of a handle-bar or yoke has been provided.

This auxiliary handle-bar or yoke, which is indicated by the reference-character 8, is preferably arc-shaped, as shown, and at its free ends, the said bar or yoke is provided with perforated ears 9 and 10. Suitably secured to the above-mentioned members 4 and 5 of the main steering yoke 1 are suitably formed clamps, as 11, or other fastening devices, usually provided with perforated ears or lugs 12 and 13, in which are arranged suitable fastening screws or bolts 14, each screw or bolt being provided upon its screw-threaded shank with a lock-nut 15, for tightly fastening the clamp in place, and with an adjusting nut 16, preferably in the form of a wing-nut.

The above-mentioned auxiliary handle-bar or yoke 8 is movably disposed between the members or arms 4 and 5, by having its perforated end-portions or ears 9 and 10 pivotally mounted upon the respective screws or bolt 14, a loose pivotal connection thus being produced which will permit the swinging of the bar or yoke 8 on its end-portions or ears on axes of rotation at an angle to each other without binding of the said end-portions or ears upon the bolts 14. However, a certain amount of frictional contact between the parts may be produced, so as to prevent too free a movement of the said auxiliary handle-bar or yoke 8, by an arrangement upon each screw 14, and between the respective perforated ear or lug of the said bar or yoke 8 and the lock-nut 15, of a coiled spring 17, substantially as shown in Figures 1 and 3 of the drawings.

When riding, the usual arrangement of the auxiliary handle-bar or yoke 8, is usually that shown in Figure 2 of the drawings, the said bar or yoke 8 being angularly disposed, as shown, so as to rest in the lap of the rider, which permits the rider to take hold of the said bar or yoke 8 with one or both hands, for the proper guiding and steering of the vehicle, as will be clearly understood. By this means the rider can direct the vehicle with great ease and comfort to himself, and can still manipulate the gas and air-supplying devices upon the arms 4 and 5, with either hand when necessary.

In dismounting, the auxiliary handle-bar or yoke 14, may be readily thrown into the position indicated in the dotted outline in said Figure 2 of the drawings, by kicking the same by means of the knee in an upward direction, thereby facilitating a quick dismount, when necessary.

Of course, I am fully aware that some changes may be made in the general arrangements and combinations of the various devices and parts, as well as in the details of the construction of the said parts, without departing from the scope of the present invention as set forth in the foregoing specification, and as defined in the clauses of the claims which are appended to the said specification. Hence, I do not limit my present invention to the exact arrangements and combinations of the several devices and parts as described in the said specification, nor do I confine myself to the exact details of the construction of the said parts, as illustrated in the accompanying drawings.

I am also aware, that the general shape of the auxiliary bar may be changed, and that in lieu of the forms and constructions of clamps for pivotally connecting the ends of the auxiliary bar to the arms 4 and 5, any other suitably constructed fastening means may be employed.

I claim:—

1. In a motor cycle, or the like, the combination of a handle-bar having a transversely extending portion and rearwardly extending arms, lying substantially in the same plane, an auxiliary handle-bar, and means for freely pivotally connecting the ends of said auxiliary bar to the inner sides of the rearwardly extending arms on a substantially transverse axis, permitting said auxiliary bar normally to lie in a plane extending angularly to the plane of the handle-bar and to be moved upwardly between said arms and brought to rest upon the handle-bar.

2. In combination with the main steering element of a vehicle, as a motor-cycle, or the like, said element comprising a pair of handle-bars or arms, of an auxiliary steering member comprising a bar provided at its ends with perforated ears, a clamp mounted upon each handle-bar or arm of the main steering element, pivot-bolts for securing said clamps in position, the perforated ears of said auxiliary steering member being movably mounted upon said pivot-bolts, a lock-nut upon each bolt, a coiled spring upon each bolt between the lock-nut and a perforated ear of said auxiliary steering member, and an adjusting nut upon each pivot-bolt.

3. In combination with the main steering element of a vehicle, as a motor-cycle, or the like, said element comprising a pair of handle-bars or arms, of an arc-shaped auxiliary steering member comprising a bar provided at its ends with perforated ears, a clamp mounted upon each handle-bar or arm of the main steering element, pivot-bolts for securing said clamps in position, the perforated ears of said auxiliary steering member being movably mounted upon said pivot-bolts, a lock-nut upon each bolt, a coiled spring upon each bolt between the lock-nut and a perforated ear of said auxiliary steering member, and an adjusting nut upon each pivot-bolt.

In testimony, that I claim the invention set forth above I have hereunto set my hand this 6th day of August, 1920.

MICHAEL ERSHKOWITZ.

Witnesses:
 FREDK. H. FRAENTZEL,
 BARBARA W. SUTTERLIN.